Oct. 31, 1961 M. DRAENERT 3,006,390
PORTABLE POWER-OPERATED EDGE-TRIMMING TOOL
Filed Sept. 26, 1958 2 Sheets-Sheet 1
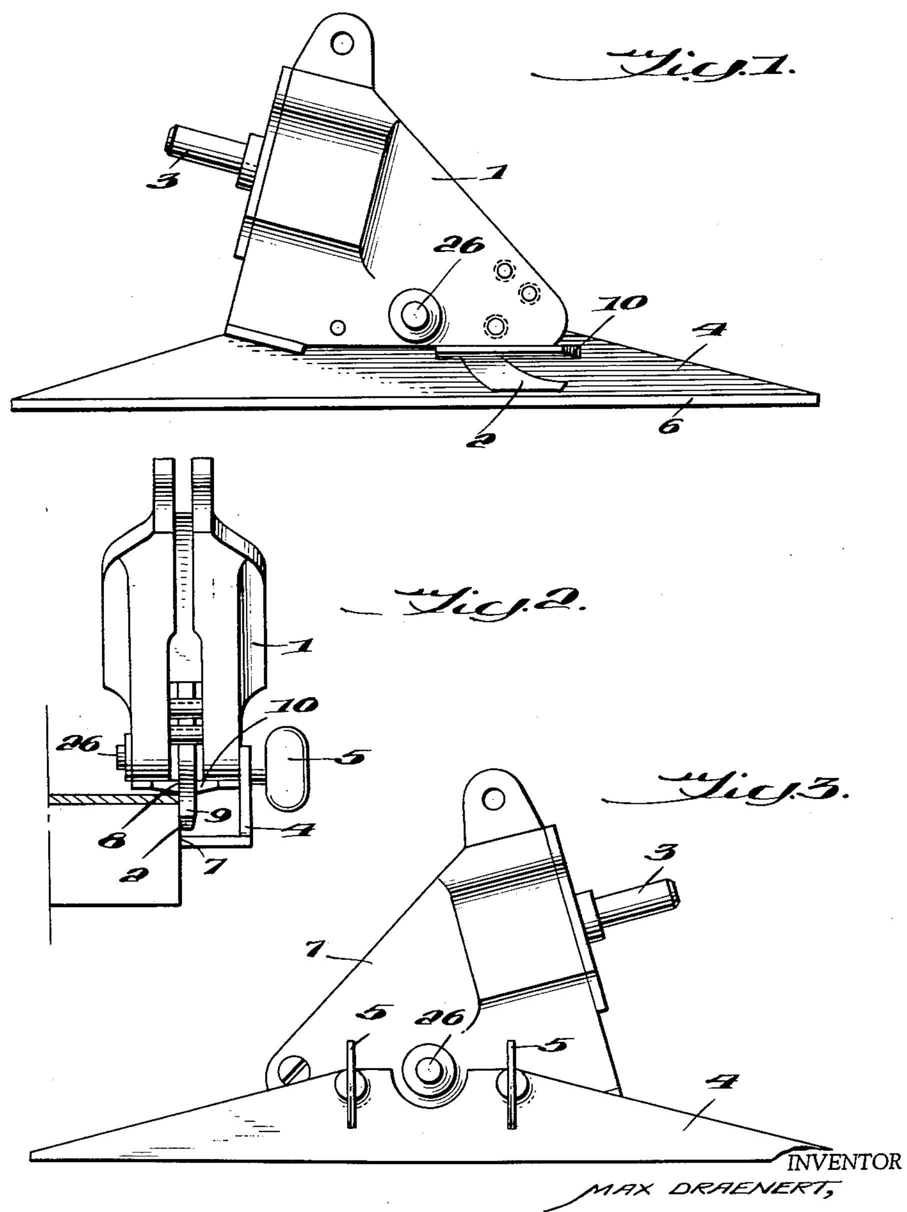
INVENTOR
MAX DRAENERT,
BY
Bailey, Stephens & Huettig
ATTORNEYS PORTABLE POWER-OPERATED EDGE-TRIMMING TOOL
Filed Sept. 26, 1958 2 Sheets-Sheet 2
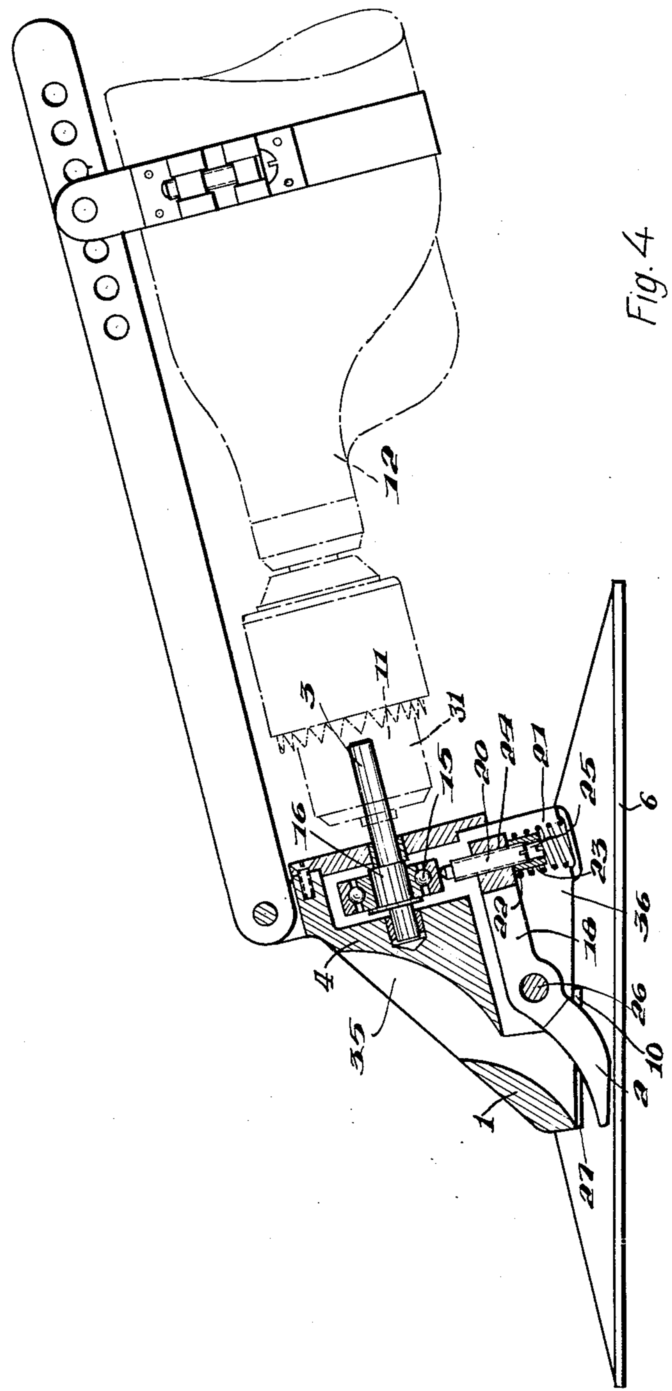
INVENTOR
MAX DRAENERT,
BY Bailey, Stephens & Huettig
ATTORNEYS United States Patent Office 3,006,390

Patented Oct. 31, 1961

1

3,006,390

PORTABLE POWER-OPERATED EDGE-TRIMMING TOOL

Max Draenert, Bahnhofstrasse 16, Reichenbach (Fils), Germany

Filed Sept. 26, 1958, Ser. No. 763,741
Claims priority, application Germany Sept. 27, 1957
1 Claim. (Cl. 144—117)

The invention is concerned with cutting tools and more especially with power-actuated cutting tools for cutting plates or sheets of artificial material unreleasably connected with a base plate, for example, of a wooden material. For making, for example, table tops or the like, there are often used plates of artificial material glued upon suitable wooden plates. These plates of artificial material are given their shape by means of a rotary cutter or a circular saw. However, in this case the faces made by the cut are not even and smooth. Moreover, the upper face of the plate of artificial material often presents cracks or the like. Because of these draw-backs, the plate of artificial material mostly is given at first a shape of somewhat greater dimensions than those of the wooden base plate so that its edges project beyond the edges of the artificial plate. Then, the projecting margins of the base plate are smoothed by a planing operation. However, since the plates of artificial material are relatively hard, the blades of the planing tool are often damaged. In addition, also during the planing operation the plates of artificial material can be damaged by cracks or the like.

It is the main object of this invention to provide a cutting tool which makes it possible to so cut the plates of artificial material that the edges of these latter and those of the base plate lie flush.

Another specific object of this invention is to provide a cutting tool an abutting face of which is guided on the base plate such that the projecting edges of the plate of artificial material may be severed easily and correctly and without any damaging of tool and plate.

A further object of the invention is to provide a tool easy to handle and reliable in service and which enables the operator to perform his work with absolute accuracy.

With these and other objects in view, which will appear as the description proceeds, the invention consists of certain novel features of construction as will be particularly pointed out in the appended claim.

The manner of carrying the invention into effect is hereinafter described by way of example, reference being had to the accompanying drawings, in which FIG. 1 is a side view of a cutting tool according to the invention as viewed from the side facing the plate to be machined.

FIG. 2 is a front view thereof and

FIG. 3 is a side view of the cutting tool of FIG. 1 as viewed from the side remote of the plate to be machined.

FIG. 4 is a sectional side view of the cutting tool.

The cutting tool according to the invention is an improvement upon that disclosed in my Patent No. 2,760,265 and serves for cutting off plates of artificial material unreleasably connected with a base plate, for example, of wooden material and the edges of which project beyond the edges of said base plate, whereby the cutting operation must be so performed that the edges of said plate of artificial material and those of said base plate lie flush after the end of the operation.

Referring more particularly to FIG. 4 of the drawing, 31 designates a rotating chuck fixed on the electrically driven hand drill 12 and serving to clamp the driving shaft 3 which projects from the body of the cutter head.

2

The shaft 3 carries an eccentric 16 upon which there is fixed the inner race of the ball bearing 15, the non-rotating outer race of which serves to transmit the oscillatory motion of the eccentric 16 to the lever 18 through the agency of a cam follower screw 20 screwed to the lever 18, and disposed right angularly to the longitudinal axis of the latter. The body 4 is formed with a substantially longitudinally disposed slot 36 and a slot 35 directed upwardly therefrom and communicating with said longitudinally disposed slot 36. The lever 18, which is accommodated in said longitudinally disposed slot 36, is pivoted to the body of the cutter head by means of a pin or bolt 26, and carries on its free end a cutting blade 2. The end 22 of the compression spring 21 arranged coaxially with the screw 20 bears against the lever 18 and surrounds a sleeve 23 which is mounted upon the lever 18 coaxially with the tapped hole 24 serving for the reception of the screw 20, and which has a correspondingly shaped and arranged hole 25 for the reception of the screw head. Thus, the operative motion of the cutting blade is generated by the drive of the cutting tool, whereas the return stroke takes place under the action of the compression spring 21.

The two lateral edges of the cutting blade 2 serve as movable blades and the corresponding stationary blades are constituted by the side of the slot of a die member 27 so affixed by means of screws or the like to the body 4 that the slot of the die member 27 registers with the slot 36 of the body. The sides of the die member slot, between which the cutting blade 2 rockingly moves when in operation, are made of hardened steel or other suitable material adapted to enhance the cutting properties of the tool. The cutting blade 2 and the power-actuatable shaft 3 project from the housing 1 of the cutting tool according to the invention. To the housing 1 there is releasably secured on its side remote from the plate to be machined an angle iron 4 by means of screws 5. The other leg 6 of the angle iron 4 is situated directly beneath the cutting blade 2. Its outer marginal face 7 lies in a plane together with the side edge 8 of the slot 9 of the die member 10 in which the cutting blade 2 is guided. The side edge 8 constitutes one of the two stationary blades and faces the work piece. When using the tool for cutting the projecting edge of the plate of artificial material, the marginal face 7 applies against the base plate so that it is guided correctly. Thereby, the edge of the plate of artificial material can be so cut off that the edges of the plate of artificial material and those of the base plate lie flush with one another.

The foregoing description is directed solely towards the constructions illustrated, but I desire it to be understood that I reserve the privilege of resorting to all mechanical changes to which the device is susceptible, the invention being defined and limited only by the terms of the appended claim.

Having thus described the invention what I claim as new and desire to secure by Letters Patent is:

A portable power operated cutting tool for trimming the edges of plates of artificial material permanently connected with a base plate and comprising a body with a lower face having a substantially longitudinally disposed slot the side edges of which constitute two stationary blades, a movable double-edged cutting blade interposed therebetween and mounted in said longitudinally disposed slot for cooperation with said stationary blades, an abutting face arranged beneath said cutting blade to be applied against the base plate connected with said plate to be trimmed, said abutting face lying in the same plane with a side edge of said slot constituting one of said stationary blades, said abutting face being constituted by the outer marginal face of an angle iron releasably secured with its other leg to said body of said cutting tool, whereby upon cutting off said plate of artificial material the edges of said plate of artificial material lie flush with the edges of said base plate permanently connected therewith.

References Cited in the file of this patent

UNITED STATES PATENTS

| | | |
|---|---|---|
| 2,705,032 | Pearson | Mar. 29, 1955 |
| 2,714,408 | Pedersen | Aug. 2, 1955 |
| 2,756,785 | Godfrey | July 31, 1956 |
| 2,760,265 | Draenert | Aug. 28, 1956 |
| 2,810,956 | Buchanan | Oct. 29, 1957 |
| 2,839,107 | Emmons | June 17, 1958 |
| 2,856,975 | Addis | Oct. 21, 1958 |
| 2,878,842 | Pickersgill | Mar. 24, 1959 |

FOREIGN PATENTS

| | | |
|---|---|---|
| 712,071 | Great Britain | July 14, 1954 |
| 765,292 | Great Britain | Jan. 9, 1957 |
| 603,858 | France | Jan. 14, 1926 |